United States Patent
Deshpande et al.

(10) Patent No.: US 11,088,945 B1
(45) Date of Patent: Aug. 10, 2021

(54) DYNAMIC SOURCE-DRIVEN PATH SETUP ACROSS A SWITCH FABRIC

(71) Applicant: Hewlett Packard Enterprise Development LP, Houston, TX (US)

(72) Inventors: Kartik Deshpande, Nashua, NH (US); Scott Griffiths, Nashua, NH (US); Jason Nyberg, Nashua, NH (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2 days.

(21) Appl. No.: 16/786,716

(22) Filed: Feb. 10, 2020

(51) Int. Cl.
*H04L 12/703* (2013.01)
*H04L 12/947* (2013.01)
*H04L 12/721* (2013.01)
*H04L 12/741* (2013.01)

(52) U.S. Cl.
CPC .............. *H04L 45/28* (2013.01); *H04L 45/66* (2013.01); *H04L 45/745* (2013.01); *H04L 49/25* (2013.01)

(58) Field of Classification Search
CPC ......... H04L 45/00; H04L 45/22; H04L 45/24; H04L 45/245; H04L 45/26; H04L 45/28; H04L 45/54; H04L 45/66; H04L 45/74; H04L 45/742; H04L 45/745; H04L 45/7453; H04L 47/10; H04L 49/25; H04L 49/351; H04L 49/352; H04L 49/354; H04L 49/3009; H04L 12/467
See application file for complete search history.

(56) References Cited

U.S. PATENT DOCUMENTS

| 4,656,622 A | 4/1987 | Lea et al. |
| 8,514,744 B2 | 8/2013 | Ghosh et al. |
| 2013/0039218 A1 | 2/2013 | Narasimhan et al. |
| 2014/0044130 A1* | 2/2014 | Banavalikar .......... H04L 49/351 370/392 |
| 2014/0092901 A1* | 4/2014 | Kapadia ................ H04L 49/356 370/390 |

(Continued)

OTHER PUBLICATIONS

Juniper Networks, Inc., "Layer 2 Forwarding Tables," Sep. 11, 2019, Tech Library, pp. 1-29, Retrieved from the Internet on Oct. 23, 2019 at URL: <juniper.net/documentation/en_US/junos/topics/topic-map/layer-2-forwarding-tables.html>.

*Primary Examiner* — Peter Chen
(74) *Attorney, Agent, or Firm* — Jaffery Watson Mendonsa & Hamilton

(57) ABSTRACT

A computer implemented method comprises receiving an ethernet frame on an access port of a source switch in a switch fabric, the ethernet frame comprising a source media access control (SMAC) address and a destination media access control (DMAC) address, in response to a determination that the destination media access control address is not programmed into a media access control table of the source switch sending a destination lookup failure (DLF) message to a control plane associated with the switch, the destination lookup failure (DLF) message indicating that the destination media access control address received with the frame is not programmed into a media access control table of the source switch, and in response to a determination that the destination media access control address is programmed into a media access control table of at least one switch of the plurality of additional switches in the switch fabric, initiating a sequenced path setup on the source switch.

20 Claims, 6 Drawing Sheets

(56) References Cited

U.S. PATENT DOCUMENTS

| | | | |
|---|---|---|---|
| 2014/0254377 A1 | 9/2014 | Wakumoto et al. | |
| 2014/0294010 A1* | 10/2014 | Biswas | H04L 61/103 370/392 |
| 2015/0043581 A1* | 2/2015 | Devireddy | H04L 49/70 370/392 |

* cited by examiner

200

| Source MAC Address 210 | Destination MAC Address 220 | Switch ID 230 | Port 240 |
|---|---|---|---|
| 001004841446 | 014844281984 | 1 | 15 |
| 081405827145 | 004264198456 | 5 | 7 |
| 084134418492 | 082844246812 | 2 | 11 |
| 0068159635015 | 006815-635015 | 4 | 2 |

●

●

●

| 0104826571952 | 0916543782816 | 6 | 4 |
| 0083718687105 | 005839845714 | 4 | 1 |

FIG. 2

DYNAMIC SOURCE-DRIVEN PATH SETUP ACROSS A SWITCH FABRIC

BACKGROUND

A switch fabric comprises a set of networking switches which are interconnected by individual communication links (e.g., Ethernet links). In some examples, traffic through a switch fabric may be programmed to follow an algorithmically-determined path from a source switch to a destination switch based on the destination MAC (DMAC) addresses in ethernet frames entering the source switch.

BRIEF DESCRIPTION OF THE DRAWINGS

Embodiments described here are illustrated by way of example, and not by way of limitation, in the figures of the accompanying drawings in which like reference numerals refer to similar elements.

FIG. 2 is a schematic illustration of a MAC address table, in accordance with an embodiment.

DETAILED DESCRIPTION

Figure 1:
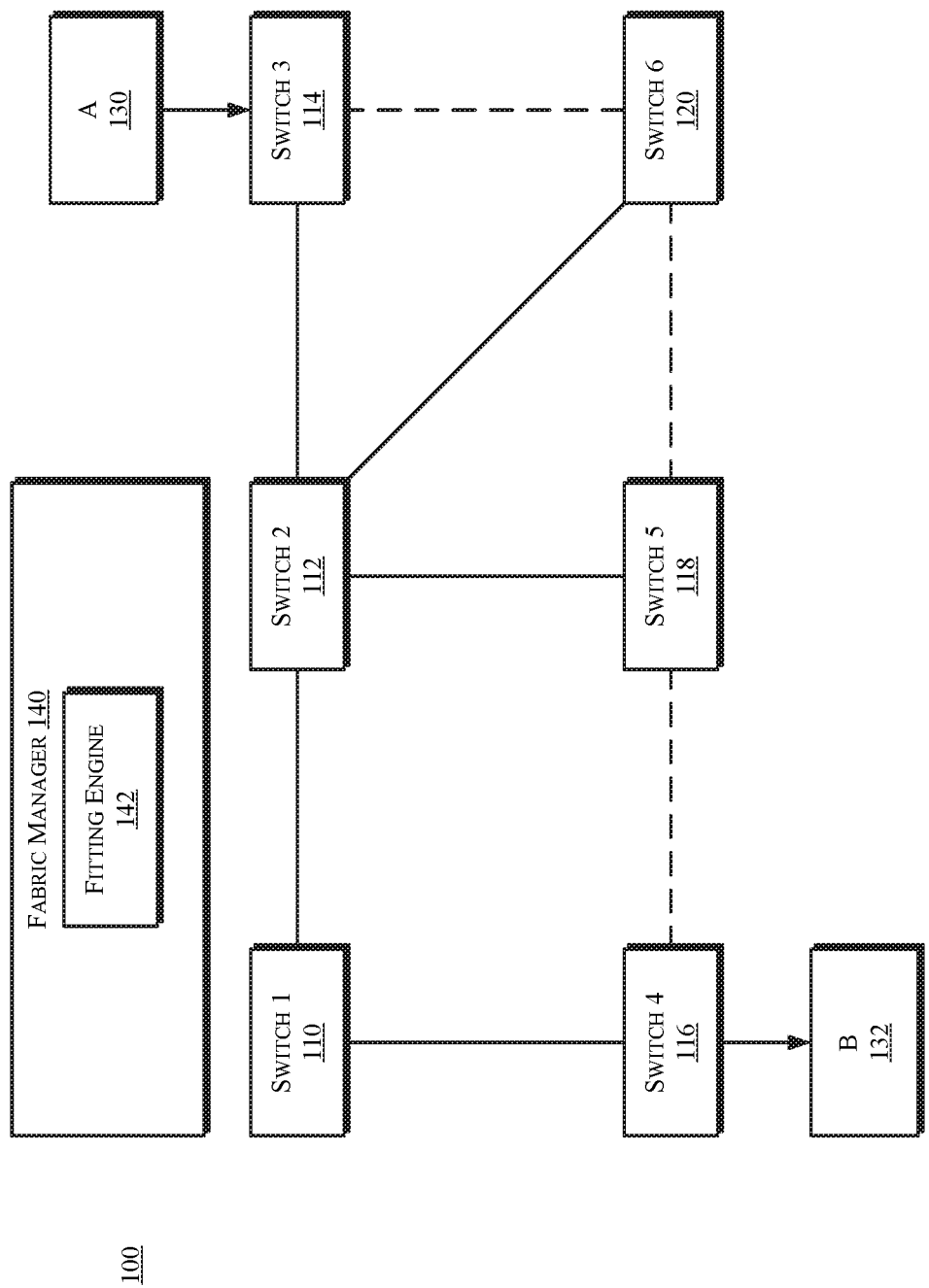
FIG. 1 is a schematic illustration of an example environment in which dynamic source-driven path setup across a switch fabric may be implemented, in accordance with an embodiment.

In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

As used herein, the term "network switch" may refer to a physical switch that may be incorporated into plurality of physical switches that are interconnected via member links to function as a switch fabric. The interconnected member nodes may additionally or in other examples be termed a virtual switch, a logical switch, a front plane stack virtual switch, a fabric switch, a virtual switching framework, or the like. The terms "packet," "data packet," or "frame" may refer to a group of bits that may be transported together across a network. In one regard, these terms should not be construed as being limited to Layer 2 or Layer 3 traffic. Instead, these terms may be used interchangeably herein to refer to traffic that may be communicated over either or both Layer 2 or Layer 3 networks.

As mentioned above, in some examples, switches in a switch fabric may be programmed independently and asynchronously. During the programming phase, unprogrammed frames may be flooded along a predetermined loop tree spanning topology to ensure delivery of all frames to the destination. In large-scale switch fabrics, the asynchronous nature of programming individual flows can result in a high rate of duplicate frames delivered to the destination and brief intervals of traffic loops between sets of switches. All switches in the path from the source switch to the destination switch must make the same forwarding decisions to ensure that the traffic is delivered to the destination. The switches in the fabric may also compute a loop free topology which is used to forward packets whose destination is unknown.

In some examples, switches may be programmed independently and asynchronously. Each switch maintains a consistent state of the switch fabric and local events trigger the programming individually. During the programming phase, unprogrammed frames may be flooded along a pre-determined loop tree spanning topology to ensure delivery of all frames to the destination. In large-scale switch fabrics, the asynchronous nature of programming individual flows can result in a high rate of duplicate frames delivered to the destination and brief intervals of traffic loops between sets of switches.

Described herein are exemplary systems and methods to implement dynamic source-driven path setup across a switch fabric. In some examples a coordinated programming approach to path setup is driven by the traffic ingress switch along the path to the traffic egress switch using in-band signaling between switches. Techniques described herein implement a source-to-destination programmed path that is signaled from source to destination but is programmed along the reverse path. This ensures that unicast traffic allowed onto any portion of the programmed path will reliably reach the destination without duplicate or looped ethernet frames.

Ethernet ports on switches in a composable fabric (CF) are assigned to be either an access port or a fabric port. Access ports are used to connect servers, storage, routers and non-CF switches to the switch fabric. Fabric ports are connected between CF switches in the switch. When a switch receives a packet on an access port with a source media access control (MAC) address (SMAC) that is not currently programmed in the switch's hardware L2 MAC address table, it triggers a source lookup failure (SLF). This allows the control plane of the switch to learn about the existence of the SMAC. The source switch signals details of this new SMAC to all other switches in the CF, such that each switch in the fabric maintains a list of all the MACs that are connected to each switch in the fabric.

FIG. 1 is a schematic illustration of an example environment in which dynamic source-driven path setup across a switch fabric may be implemented, in accordance with an embodiment. Referring to FIG. 1, the switch fabric 100 depicted includes six switches identified as switch 1 110, switch 2, 112, switch 3 114, switch 4 116, switch 5 118, and switch 6 120. As shown, switch fabric 100 is implemented as a mesh topology, where each one of switches 110, 112, 114, 116, 118, 120 is connected directly to an adjacent switch by a suitable communication connection, e.g., an Ethernet link.

A source device such as device A 130 is communicatively coupled to switch 3 114 via an access port of switch 3 114. Device A 130 may be a server, client device, or other computer. The connection between source device 130 and switch 3 114 may include one or more network segments, transmission technologies and components. A destination device such as device B 132 is communicatively coupled to switch 4 116. Device B 132 may be a server, client device, or other computer. The connection between destination device B 132 and switch 3 114 may include one or more network segments, transmission technologies and components.

Switch fabric 100 may include a Fabric Manager (FM) 140, which is a controller application that is responsible for managing the entire switch fabric 100. The FM 140 may include a fitting engine 142, which uses information about all fabric links in the CF and other computational inputs to compute sets of paths between all CF switches in the fabric 100. This information may be provided to each switch to provide a consistent set of instructions for forwarding traffic through the fabric 100.

FIG. 2 is a schematic illustration of a MAC address table, in accordance with an embodiment. Referring to FIG. 2, in some examples a MAC address table 200 comprises a source MAC Address column 210, a destination MAC address column 220, a switch ID column 230, and a port column 240. Each entry in the table 200 thus associates a switch ID 230 and a port number 240 with each MAC address 210. As described above, each switch in the switch fabric 100 maintains a copy of the MAC address table 200 in a computer readable memory.

By way of overview, when a switch such as switch 3 114 receives an ethernet frame on an access port, with a destination MAC (DMAC) that is not programmed in the MAC table 200 of the switch, the switch 3 114 generates a Destination Lookup Failure (DLF) providing information to the switch control plane about the unprogrammed destination. In response to the DLF, the switch 3 114 determines if the DMAC has already been learned on some switch in the fabric (i.e., if the DMAC exists in the distributed MAC table 200 in another switch. If the DMAC is found, the switch 3 114 initiates a sequenced path setup operation. By contrast, if the DMAC is not already in the distributed MAC table, the switch 3 114 may flood the Ethernet frame to a broadcast domain of the switch 3 114.

Figure 3:
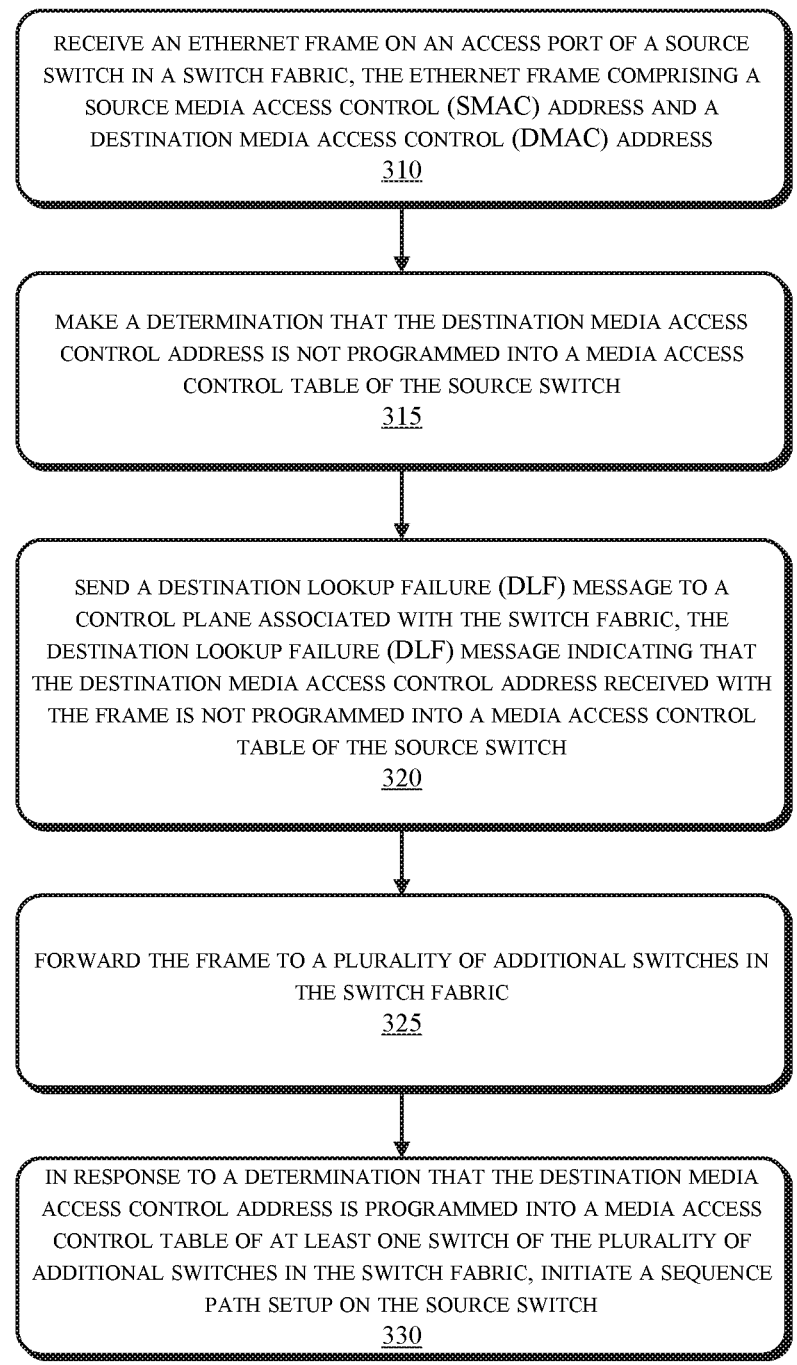
FIG. 3 is a flow diagram of a method to implement dynamic source-driven path setup across a switch fabric, in accordance with an embodiment.

FIG. 3 is a flow diagram of a method to implement dynamic source-driven path setup across a switch fabric, in accordance with an embodiment. In some embodiments, one or more operations depicted in FIG. 3 may be executed substantially concurrently (i.e., contemporaneously) or in a different order than depicted in FIG. 3. In some embodiments, a method may include more or fewer operations than are shown. In some embodiments, one or more of the operations of a method may, at certain times, be ongoing and/or may repeat.

The methods described herein may be implemented in the form of executable instructions stored on a machine readable medium and executed by one or more processors and/or in the form of electronic circuitry. For example, the operations may be performed in part or in whole by the controller 410 depicted in FIG. 4.

Referring to FIG. 3, at operation 310, an ethernet frame is received on an access port of a source switch in a switch fabric. In the example illustrated in FIG. 1, an ethernet frame may be received from device A 130 on an access port of switch 3 114. In some examples the ethernet frame comprises a source media access control (SMAC) address 210 and a destination media access control (DMAC) address 220, as illustrated in FIG. 2. In the example depicted in FIG. 1, the destination media access control (DMAC) address may be the address of destination device B 132.

At operation 315, a determination is made that the destination media access control address in the ethernet frame is not programmed into a media access control table of the source switch. In some examples, the source switch may search the MAC address table 200 that resides in a memory of the source switch to determine whether the destination MAC address is in the table. If the destination MAC address is in the table, the source switch may route the frame through the switch fabric. By contrast, if the destination MAC address is not in the table then the source switch may make a determination that the destination MAC is not programmed into the MAC table.

At operation 320, in response to the determination made at operation 315 that the destination MAC address is not programmed into the MAC table, the source switch sends a destination lookup failure (DLF) message to a control plane associated with the switch fabric. In some examples, the destination lookup failure (DLF) message indicates that the destination media access control address received with the frame is not programmed into a media access control table 200 of the source switch. In response to the DLF message, each switch will determine whether the destination MAC address resides within its MAC address table. If the destination MAC address is located then the source switch initiates a sequenced path setup as described in operation 330.

By contrast, if the DLF message fails, at operation 325, the source switch forwards the frame to a plurality of additional switches in the switch fabric 100 in response to the determination that the destination MAC address is not present in the MAC address table. Each switch that receives the ethernet frame will implement the operations depicted in FIG. 3. At operation 330, in response to a determination that the destination media access control address is programmed into a media access control table (i.e., the distributed MAC table on access side) of at least one switch of the plurality of additional switches in the switch fabric, a sequenced path setup is initiated on the source switch 3 114. The sequenced path setup is described in greater detail below with reference to FIG. 5.

Figure 4:
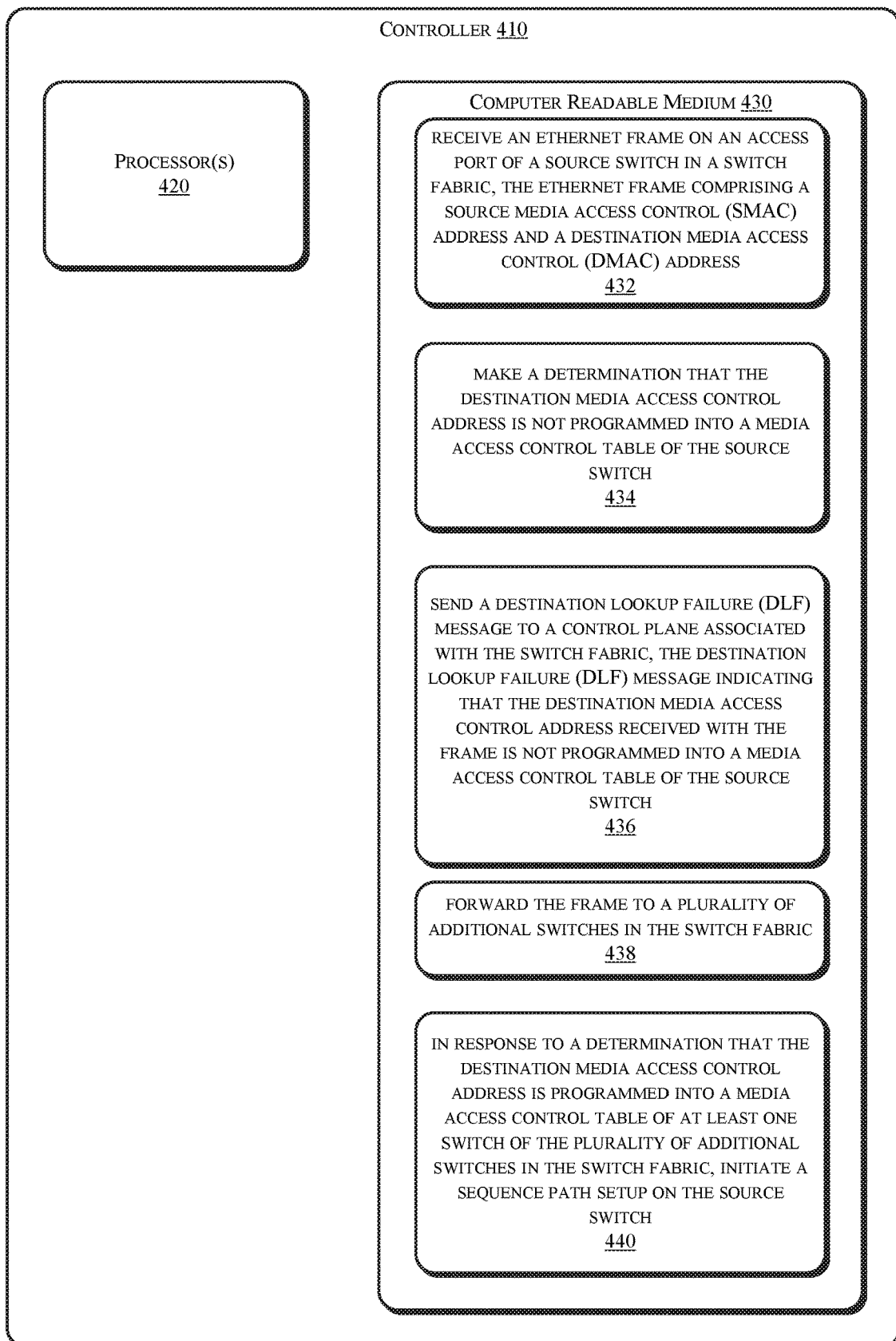
FIG. 4 is schematic illustration of a system to implement dynamic source-driven path setup across a switch fabric, in accordance with an embodiment.

FIG. 4 is schematic illustration of a system to implement dynamic source-driven path setup across a switch fabric, in accordance with an embodiment. More particularly, FIG. 4 depicts a controller 410 which comprises one or more processors 420 communicatively coupled to a non-transitory computer-readable medium 430 encoded with instructions 432, 434, 436, 438, 440. The processor(s) 420 may be implemented as a general-purpose processing device, a programmable device (e.g., a field programmable gate array (FPGA)), or as a hard-wired processor (e.g., an application specific integrated circuit (ASIC)). In some examples the controller 410 may be incorporated into, or communicatively coupled to, a storage manager of a node of a distributed computer system. In other examples the controller 410 may be incorporated into, or communicatively coupled to, one or more of the switches depicted in FIG. 1, or in the fabric manager 140.

Instructions 432, when executed, cause the processor(s) 420 to receive an ethernet frame is received on an access port of a source switch in a switch fabric. In the example illustrated in FIG. 1, an ethernet frame may be received from device A 130 on an access port of switch 3 114. In some examples the ethernet frame comprises a source media access control (SMAC) address 210 and a destination media access control (DMAC) address 220, as illustrated in FIG. 2. In the example depicted in FIG. 1, the destination media access control (DMAC) address may be the address of destination device B 132.

Instruction 434, when executed, causes the processor(s) 420 to make a determination that the destination media access control address in the ethernet frame is not programmed into a media access control table of the source switch. In some examples the source switch may search the MAC address table 200 that resides in a memory of the source switch to determine whether the destination MAC address is in the table.

Instruction 436, when executed, causes the processor(s) 420, in response to the determination made at operation 315, to cause the source switch to send a destination lookup failure (DLF) message to a control plane associated with the switch fabric. In some examples, the destination lookup failure (DLF) message indicates that the destination media access control address received with the frame is not programmed into a media access control table 200 of the source switch. In response to the DLF message, each switch will determine whether the destination MAC address resides within its MAC address table. If the destination MAC address is located then the source switch initiates a sequenced path setup as described above in operation 330.

Instruction 438, when executed, causes the processor(s) 420 in the source switch to forward the frame to a plurality of additional switches in the switch fabric 100 in response to the determination that the destination MAC address is not present in the MAC address table if the DLF message fails. As described above, each switch that receives the ethernet frame will implement the operations depicted in FIG. 3.

Instruction 440, when executed, causes the processor(s) 420 in the source, in response to a determination that the destination media access control address is programmed into a media access control table of at least one switch of the plurality of additional switches in the switch fabric, to initiate a sequenced path setup on the source switch 3 114. The sequenced path setup is described in greater detail below with reference to FIG. 5.

Figure 5:
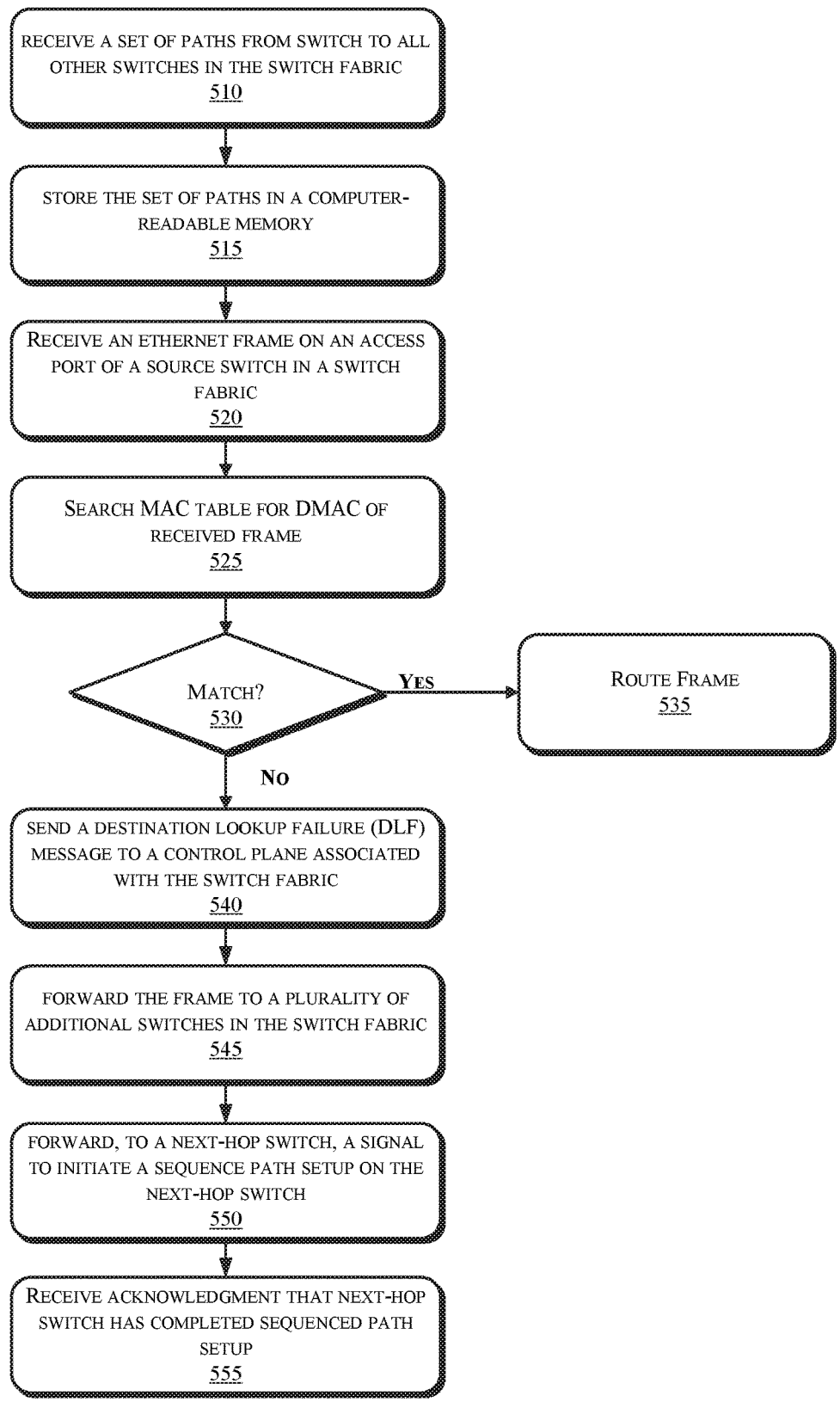
FIG. 5 is a flow diagram of a method to implement dynamic source-driven path setup across a switch fabric, in accordance with an embodiment.

FIG. 5 is a flow diagram of a method to implement dynamic source-driven path setup across a switch fabric, in accordance with an embodiment. In some examples the operations depicted in FIG. 5 may be implemented by a switch in the switch fabric 100 depicted in FIG. 2 Referring to FIG. 5, at operation 510 a set of paths between a switch and all other switches in the switch fabric is received, and at operation 515 the set of paths is stored in a computer readable memory. As described above, in some examples the fitting engine 142 of fabric manager 140 computes sets of paths between the switches 110, 112, 114, 116, 118, 120 in switch fabric 100. These sets of paths may be computed dynamically on a periodic basis or in response to changing condition in the switch fabric 100. In some examples the fabric manager 140 transmits a set of paths from a given switch to all other switches in the switch fabric 200 to each switch in the switch fabric 200, which stores the paths on a computer readable medium. In other examples the sets of paths may be stored on a computer readable medium in the fabric manager 140.

At operation 520, an ethernet frame is received on an access port of a source switch in a switch fabric. In the example illustrated in FIG. 1, an ethernet frame may be received from device A 130 on an access port of switch 3 114. In some examples the ethernet frame comprises a source media access control (SMAC) address 210 and a destination media access control (DMAC) address 220, as illustrated in FIG. 2. In the example depicted in FIG. 1, the destination media access control (DMAC) address may be the address of destination device B 132.

At operation 525 the source switch searches its MAC address table 200 for an entry that includes a DMAC that corresponds to the DMAC of the ethernet frame received in operation 520. If, at operation 530 an entry is found in the MAC address table 200 at the source switch that includes a DMAC that corresponds to the DMAC of the ethernet frame received in operation 520, then control passes to operation 535 and the switch routes the ethernet frame to the switch and port associated with the DMAC address. In some examples the source switch may apply a hashing algorithm to select a path from the set of paths from the source switch to the destination switch based upon the information provided by the fitting engine 142.

By contrast, if at operation 530 no entry is found in the MAC address table 200 at the source switch that includes a DMAC that corresponds to the DMAC of the ethernet frame received in operation 520, then control passes to operation 540 and the switch sends a destination lookup failure (DLF) message to a control plane associated with the switch fabric. In some examples, the destination lookup failure (DLF) message indicates that the destination media access control address received with the frame is not programmed into a media access control table 200 of the source switch.

At operation 545, the switch forwards the frame to a plurality of additional switches in the switch fabric 100 in response to the determination that the destination MAC address is not present in the MAC address table and at operation 550 the switch forwards to a next-hop (i.e., directly connected) switch in the fabric 100, a signal to initiate a sequenced path setup. As a result, each switch that receives the ethernet frame will implement the operations depicted in FIG. 5, beginning at operation 525. Ultimately the frame will be forwarded to the destination switch, i.e., switch 4 116 in the switch fabric 100, at which point the DMAC of destination device B 132 can be obtained. At this point the destination switch can send an acknowledgment to the previous-hop switch in the switch network that it has completed the sequenced path setup, which is received at operation 555. In some examples the acknowledgment comprises the path information for the DMAC of destination device B 132.

Figure 6:
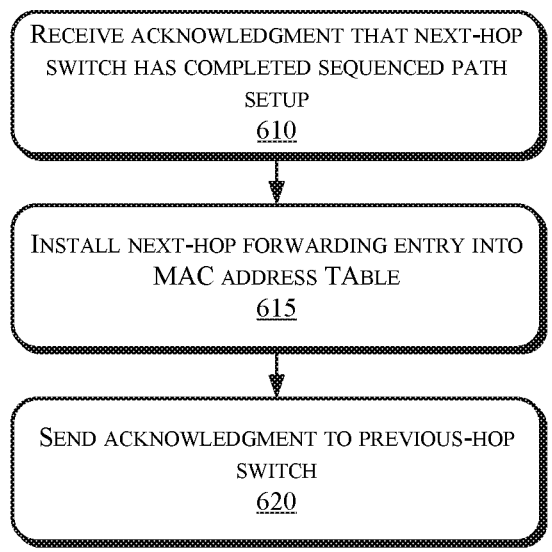
FIG. 6 is a flow diagram of a method to implement dynamic source-driven path setup across a switch fabric, in accordance with an embodiment.

FIG. 6 is a flow diagram of a method to implement dynamic source-driven path setup across a switch fabric, in accordance with an embodiment. Referring to FIG. 6, at operation 610 a CF switch in switch fabric 100 receives an acknowledgment from its next hop neighbor indicating that it has completed the sequenced path setup. At operation 615, the switch then installs the next hop forwarding entry into its local MAC address table and, at operation 620, sends an acknowledgement to the previous hop that sequenced path setup is complete. These acknowledgements follow the reverse path through the switch fabric 100 to the source CF switch where the L2 MAC table entry is updated and traffic to the destination is allowed to flow. In this manner, the switches in the path from the source to the destination are programmed in reverse, i.e., from the destination switch to the source switch. Because the fitting engine provides a uniform, consistent view of available paths, using the same path selection algorithm at each hop along the way provides a loop free path terminating at the desired destination switch.

One example of the algorithm may be described with reference to FIG. 1. As described above, the switch fabric 100 comprises six switches 110, 112, 114, 116, 118, 120. The communication links indicated by solid lines represent links that are active within the broadcast domain, so these links can carry Broadcast, Multicast and Unknown unicast traffic (also known as BUM traffic). The communication links represented by dashed lines are not part of the broadcast domain, but in a composable fabric these communication links can carry known unicast traffic.

There are two equal paths for traffic from source device A 130 to destination device B in the above diagram. The first path is from switch 3 114 to switch 2 112 to switch 1 110, then to switch 4 116. The second path is from switch 3 114 to switch 2 112 to switch 5 118, then to switch 4. For the sake of simplicity of description, it is assumed that the MAC addresses of A and B are already in MAC table of the switches.

In operation, source device A 130 sends a packet destined to B. As described above, receipt of the packet in switch 3 114 will cause switch 3 114 to issue a destination lookup failure (DLF) signal to the control plane. Switch 3 searches its MAC table 200 and determines that the MAC address of destination device B 132 is on switch 4. Switch 3 examines the path information provided by the fitting engine 142 to determine that switch 2 112 is the next hop switch in the path for destination device B 132.

Switch 3 114 programs its MAC address table to drop all packets destined to B and then sends an INSTALL message to switch 2 112. The INSTALL message includes the DMAC (B) to be installed and the destination switch station ID. Switch 3 114 enters a wait mode to hear back from the next hop switch (i.e., switch 2 112) about this MAC address.

Switch 2 112 receives the INSTALL message and checks its MAC address table to determine if the destination MAC address is programmed. If the destination MAC address is programmed in the MAC address table, then switch 2 112 returns an acknowledgement signal to switch 3 114, from which it received the INSTALL signal. If the destination MAC address is not programmed in the MAC address table, then switch 2 112 forwards the INSTALL message to the next hop switch (i.e., switch 1 110) and enters the waiting mode.

Ultimately the INSTALL message reaches destination switch 4 116. In response, switch 4 112 checks its MAC address table to determine if the destination MAC address is programmed. If the destination MAC address is programmed in the MAC address table, then switch 4 116 returns an acknowledgement signal to switch 1 110, from which it received the INSTALL signal. Switch 1 110 receives the acknowledgment signal, installs the destination MAC address of destination device B 132 into its MAC address table, and forwards the acknowledgement signal to switch 2, 112.

Switch 2 112 receives the acknowledgment signal, installs the destination MAC address of destination device B 132 into its MAC address table, and forwards the acknowledgement signal to switch 3, 114. Switch 3 114 receives the acknowledgment signal and installs the destination MAC address of destination device B 132 into its MAC address table.

By virtue of receiving acknowledgment signals in this manner, the sequenced path setup provides that the next hop switch has installed the MAC before its previous hop does, and thus traffic may be routed through a path where it will not flood downstream.

Embodiments described herein may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor-based method, comprising:
   receiving an ethernet frame on an access port of a source switch in a switch fabric, the ethernet frame comprising a source media access control (SMAC) address and a destination media access control (DMAC) address;

in response to a determination that the destination media access control address is not programmed into a media access control table of the source switch:
  sending a destination lookup failure (DLF) message to a control plane associated with the switch fabric, the destination lookup failure (DLF) message indicating that the destination media access control address received with the frame is not programmed into a media access control table of the source switch;
  dropping, at the source switch, any packets destined for the destination switch; and
  forwarding the frame to a plurality of additional switches in the switch fabric; and
in response to a determination that the destination media access control address is programmed into a media access control table of at least one switch of the plurality of additional switches in the switch fabric, initiating a sequenced path setup on the source switch.

2. The method of claim 1, further comprising, in response to the sequenced path setup:
  receiving, from a fabric manager (FM) a set of paths from the source switch to all other switches in the switch fabric; and
  storing the set of paths in a computer-readable memory.

3. The method of claim 2, further comprising:
  selecting, from the set of paths received from the fabric manager, a path through the switch fabric from the source switch to a destination switch that comprises the destination media access control address.

4. The method of claim 3, wherein the path from the source switch to the destination switch comprises one or more intermediate switches in the switch fabric.

5. The method of claim 4, further comprising:
  forwarding, to a next-hop switch in the path through the switch fabric from the source switch to the destination switch, a signal to initiate a sequenced path setup on the next-hop switch.

6. The method of claim 3, further comprising:
  applying a hash function to the set of paths received from the fabric manager.

7. The method of claim 1, wherein each switch in the switch fabric maintains a media access control (MAC) address table for the switch fabric.

8. A system, comprising:
  one or more processors; and
  a computer-readable storage medium comprising logic instructions which, when executed by the one or more processors, configure the one or more processors to perform operations comprising:
    receiving an ethernet frame on an access port of a source switch in a switch fabric, the ethernet frame comprising a source media access control (SMAC) address and a destination media access control (DMAC) address;
    in response to a determination that the destination media access control address is not programmed into a media access control table of the source switch:
      sending a destination lookup failure (DLF) message to a control plane associated with the switch fabric, the destination lookup failure (DLF) message indicating that the destination media access control address received with the frame is not programmed into a media access control table of the source switch;
      dropping, at the source switch, any packets destined for the destination switch; and
      forwarding the frame to a plurality of additional switches in the switch fabric; and
    in response to a determination that the destination media access control address is programmed into a media access control table of at least one switch of the plurality of additional switches in the switch fabric, initiating a sequenced path setup on the source switch.

9. The system of claim 8, the computer-readable storage medium comprising logic instructions which, when executed by the one or more processors, configure the one or more processors to perform operations comprising, in response to the sequenced path setup:
  receiving, from a fabric manager (FM) a set of paths from the source switch to all other switches in the switch fabric; and
  storing the set of paths in a computer-readable memory.

10. The system of claim 8, the computer-readable storage medium comprising logic instructions which, when executed by the one or more processors configure the one or more processors to perform operations comprising:
  selecting, from the set of paths received from the fabric manager, a path through the switch fabric from the source switch to a destination switch that comprises the destination media access control address.

11. The system of claim 10, wherein the path from the source switch to the destination switch comprises one or more intermediate switches in the switch fabric.

12. The system of claim 11, the computer-readable storage medium comprising logic instructions which, when executed by the one or more processors, configure the one or more processors to perform operations comprising:
  forwarding, to a next-hop switch in the path through the switch fabric from the source switch to the destination switch, a signal to initiate a sequenced path setup on the next-hop switch.

13. The system of claim 10, the computer-readable storage medium comprising logic instructions which, when executed by the one or more processors, configure the one or more processors to perform operations comprising:
  applying a hash function to the set of paths received from the fabric manager.

14. The system of claim 8, wherein each switch in the switch fabric maintains a media access control (MAC) address table for the switch fabric.

15. A non-transitory computer-readable medium comprising instructions which, when executed by a processor, configure the processor to perform operations comprising:
  receiving an ethernet frame on an access port of a source switch in a switch fabric, the ethernet frame comprising a source media access control (SMAC) address and a destination media access control (DMAC) address;
  in response to a determination that the destination media access control address is not programmed into a media access control table of the source switch:
    sending a destination lookup failure (DLF) message to a control plane associated with the switch fabric, the destination lookup failure (DLF) message indicating that the destination media access control address received with the frame is not programmed into a media access control table of the source switch;
    dropping, at the source switch, any packets destined for the destination switch; and
    forwarding the frame to a plurality of additional switches in the switch fabric; and
  in response to a determination that the destination media access control address is programmed into a media access control table of at least one switch of the plurality of additional switches in the switch fabric, initiating a sequenced path setup on the source switch.

16. The non-transitory computer-readable medium of claim 15, further comprising instructions which, when executed by the processor, configure the processor to:
perform operations comprising:
receiving, from a fabric manager (FM) a set of paths from the source switch to all other switches in the switch fabric; and
storing the set of paths in a computer-readable memory.

17. The non-transitory computer-readable medium of claim 15, further comprising instructions which, when executed by the processor, configure the processor to:
perform operations comprising:
selecting, from the set of paths received from the fabric manager, a path through the switch fabric from the source switch to a destination switch that comprises the destination media access control address.

18. The non-transitory computer-readable medium of claim 17, wherein the path from the source switch to the destination switch comprises one or more intermediate switches in the switch fabric.

19. The non-transitory computer-readable medium of claim 18, further comprising instructions which, when executed by the processor, configure the processor to:
perform operations comprising:
forwarding, to a next-hop switch in the path through the switch fabric from the source switch to the destination switch, a signal to initiate a sequenced path setup on the next-hop switch.

20. The non-transitory computer-readable medium of claim 17, further comprising instructions which, when executed by the processor, configure the processor to:
perform operations comprising:
applying a hash function to the set of paths received from the fabric manager.

* * * * *